United States Patent [19]

Horowitz et al.

[11] 4,049,790

[45] Sept. 20, 1977

[54] LAYERED MANGANESE COMPOUND OF THE FORMULA $CA_2MN_3O_8$

[75] Inventors: Harold S. Horowitz, Clark; John M. Longo, New Providence, both of N.J.

[73] Assignee: Exxon Research & Engineering Co., Linden, N.J.

[21] Appl. No.: 692,595

[22] Filed: June 3, 1976

[51] Int. Cl.$^2$ .......................................... C01G 45/12
[52] U.S. Cl. ................................ 423/599; 252/471; 429/224; 429/40
[58] Field of Search ................. 423/599, 593; 429/224

[56] References Cited

U.S. PATENT DOCUMENTS 2,703,354   3/1955   Wainer ............................... 423/599

OTHER PUBLICATIONS

Oswald et al.(1) "Nature", vol. 207, July 3, 1965, p. 72.
Oswald et al. (2), "Helv. Chemica Acta", vol. 50, 1967, pp. 2023-2034.
MacChesney et al."Physical Review", vol. 164, Dec. 1967, pp. 779-785.
Mellor, "Inorganic & Theoretical Chemistry", vol. 12, Longmans, Green & Co., N.Y., 1932, pp. 277-278.
Hoffman, "Lexikon der Anorganischen Verbindungen", vol. 2, 1912-1914, p. 100.

*Primary Examiner*—Herbert T. Carter
*Attorney, Agent, or Firm*—Joseph J. Allocca

[57] ABSTRACT

A new low temperature layered manganese compound of the formula $Ca_2Mn_3O_8$ has unexpectedly been synthesized in pure form. The unit cell dimensions of this new compound have been determined by X-ray diffraction and reveal that the compound is monoclinic with lattice parameters of $a=11.02$ A, $b=5.85$ A, $c=4.94$ A, $\alpha=90°$, $\beta=109.80°$, $\gamma=90°$. The structure consists of pseudohexagonal $Mn^{4+}$ sheets with similar oxygen sheets on either side, giving a distorted octahedral coordination to the $Mn^{4+}$. Every fourth $Mn^{4+}$ is missing in these layers, so their composition is $Mn_3O_8$ with chains of coordination octahedra linked by common edges (rutile type arrangement). The Ca ions are situated between the $Mn_3O_8$ layers.

This new $Ca_2Mn_3O_8$ compound is prepared in pure form by means of the solid solution precursor technique whereby solid solution, mixed metal carbonates of the desired metals (Ca and Mn) having the calcite structure are precipitated from mixtures of the solutions of the salts of calcium and manganese, said salts being selected from the group consisting of carbonates, nitrates, sulfates, oxalates, acetates, precipitation being the result of the addition of a source of carbonate ions, such as ammonium carbonate, sodium carbonate, potassium carbonate of $CO_2$, so as to achieve mixing on the atomic scale. The resulting solid solution mixed metal carbonate is subsequently calcined, preferably at a temperature of from between 600°-875° C to the mixed metal oxide in the pure form possessing high surface area (on the order of 20-50 m$^2$/g). This new material has uses as a battery cathode.

2 Claims, 3 Drawing Figures

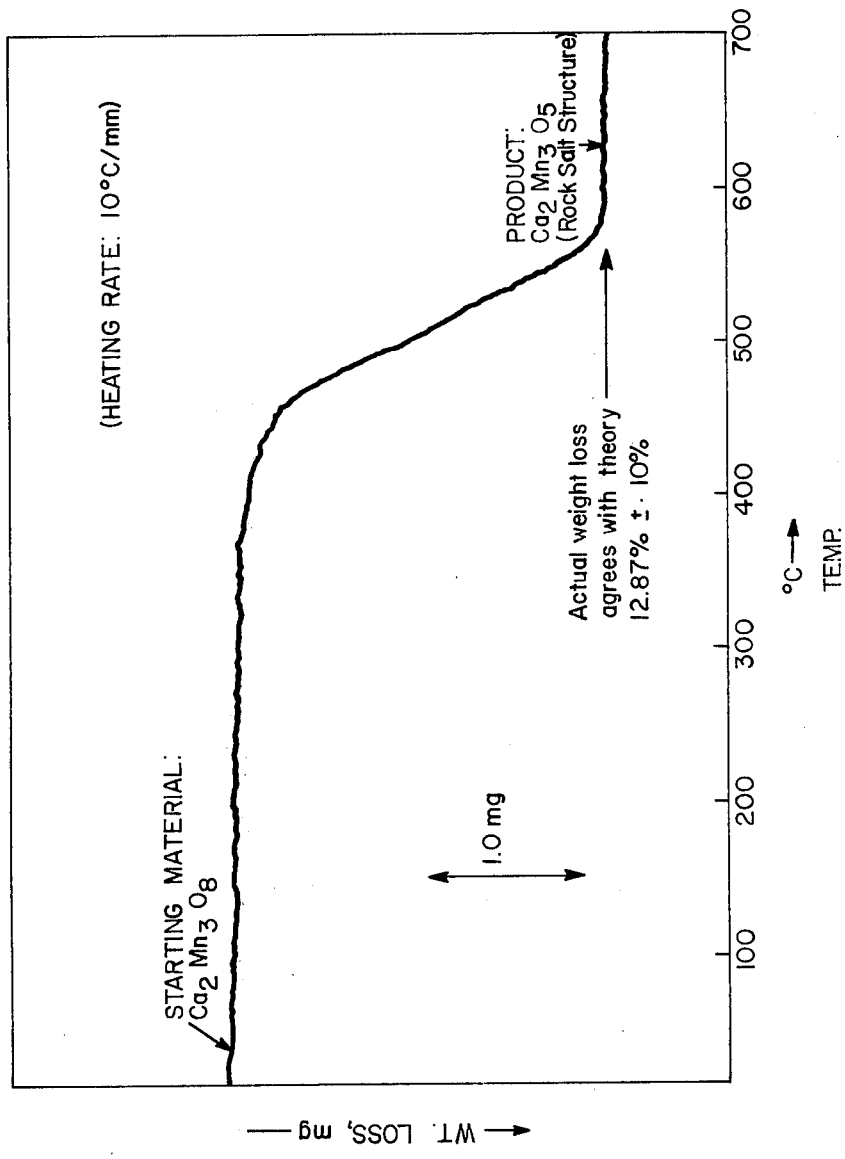

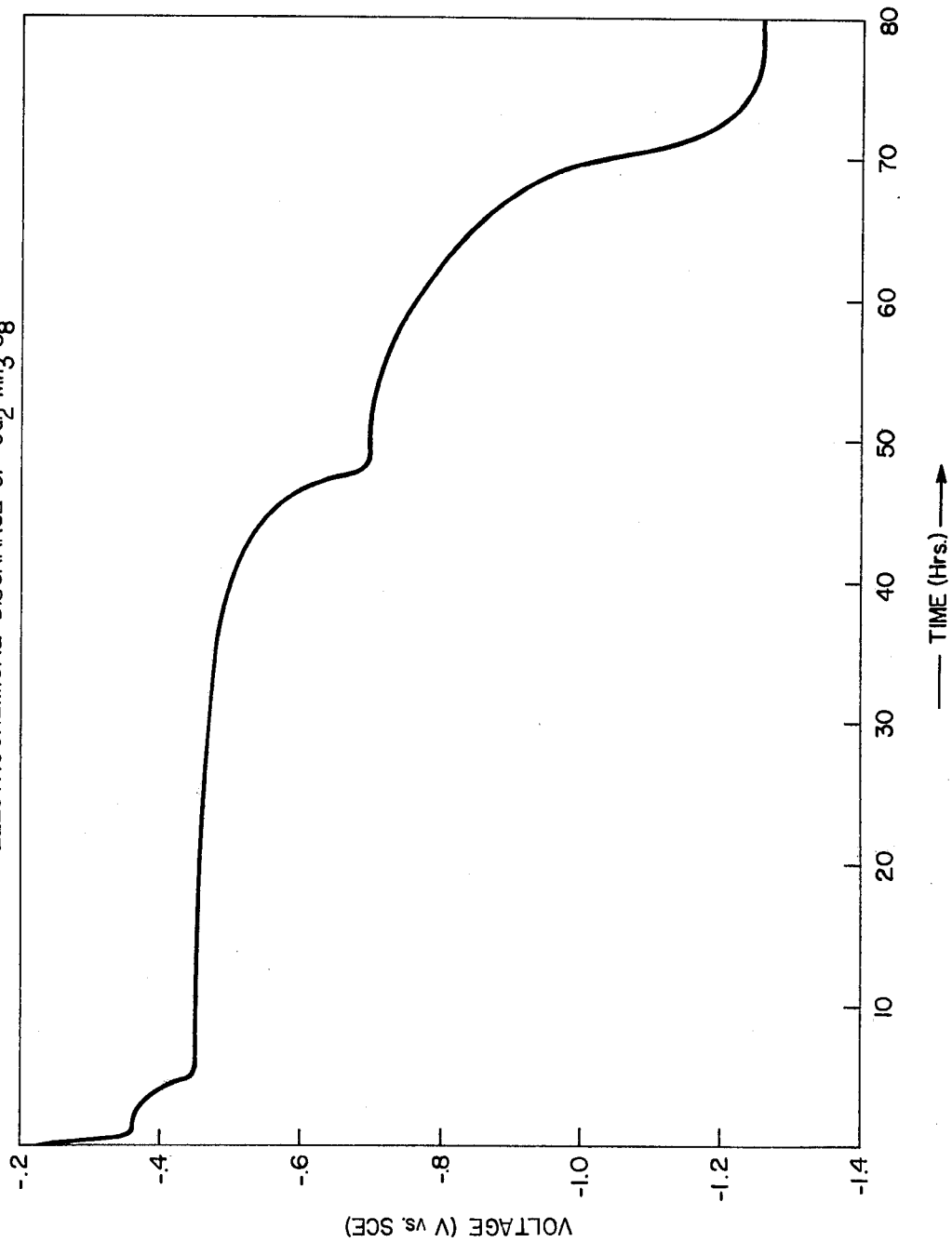

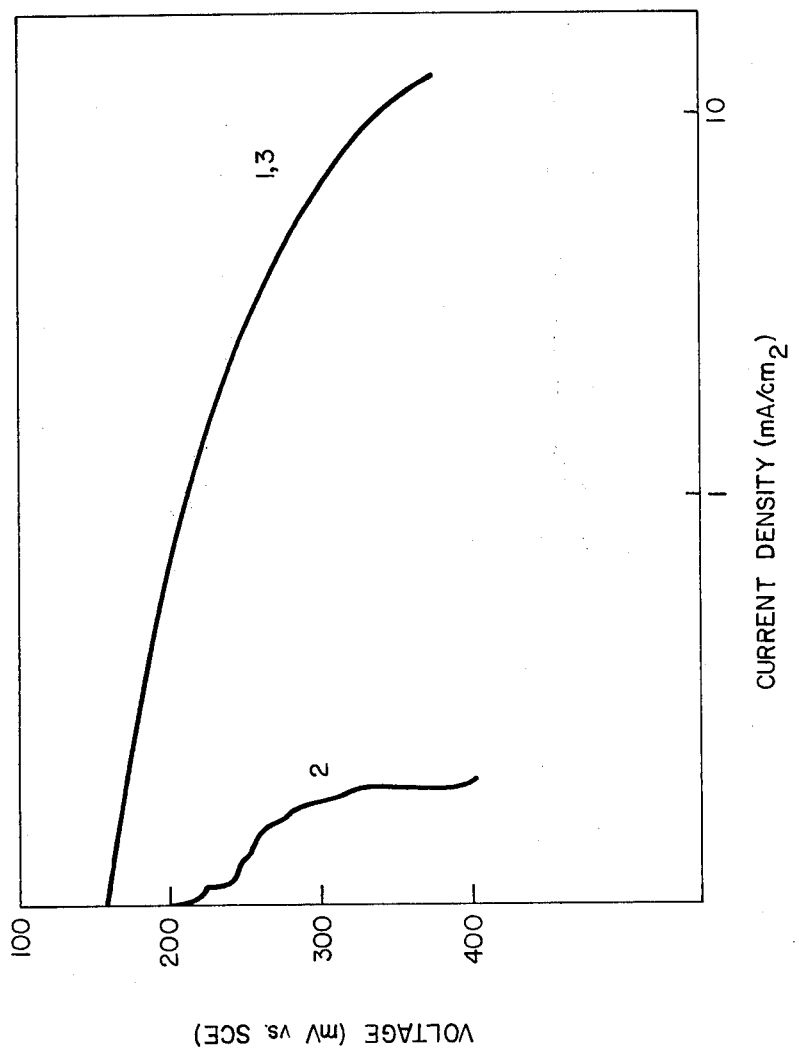

LAYERED MANGANESE COMPOUND OF THE FORMULA $CA_2MN_3O_8$

THE INVENTION

A new low temperature layered manganese compound of the formula $Ca_2Mn_3O_8$ has unexpectedly been synthesized in pure form with high surface area. The unit cell dimensions of this new compound have been determined by X-ray diffraction and reveal that the compound is monoclinic with lattice parameters of $a = 11.02$ A, $b = 5.85$ A, $c = 4.94$ A, $\alpha = 90°$, $\beta = 109.80°$, $\gamma = 90°$.

This new $Ca_2Mn_3O_8$ compound is prepared in pure form by means of the solid solution precursor technique described in copending U.S. Application Ser. No. 684,744 filed May 10, 1976 herein incorporated by reference, whereby solid solution mixed metal carbonates of the desired metals (in this case Ca and Mn) having the calcite structure are precipitated from mixtures of the solutions of the salts of calcium and manganese, said salt being selected from the group consisting of carbonates, nitrates, acetates, sulfates, and oxalates, preferably carbonates, the only requirement being that when the two metal salt solutions are mixed, they do not result in the formation of a spontaneous precipitate and further, that when mixed with the source of carbonate ions (as described below) no competing precipitate is formed, i.e. only calcite structure mixed metal carbonates result. Precipitation is accomplished by the addition of a source of carbonate ions, such ammonium carboate, sodium carbonate, potassium carbonate or gaseous $CO_2$. Water is the preferred solvent for the preparation of the solutions of the salts of calcuim and manganese but when necessary, the formation of solutions of the salts of calcium and manganese may be facilitated by the use of dilute aqueous acid solutions, preferably dilute aqueous $HNO_3$, the acid solutions being just strong enough to cause the metal salt to go into solution, Typical acid solutions are $HNO_3$, $H_2SO_4$, $CH_3CO_2H$ and $HCl$. These metal salt solutions may be mixed at any convenient temperature, the lower limit being selected such that it does not exceed the solubility of the solutes for each solution, the upper limit being about 150° F. Preferably, the solutions are mixed at ambient (i.e. room) temperature.

$Ca_2Mn_3O_8$ is a member of a class of compounds, examples of which have previously been reported. $Mn_5O_8$ and $Cd_2Mn_3O_8$ are two such examples, and their structure has been described in detail by Oswald and Wampetich, Helv. Chem. Acta 50 (1967) 2023, as follows:

"The crystal structure consists of pseudphexagonal $Mn^{IV}$ sheets (bc) with similar oxygen sheets on either side, giving a distorted octahedral coordination to the $MN^{IV}$. As every fourth $Mn^{IV}$ is missing in these 'main layers', their composition becomes $Mn_3O_8$, and chains of coordination octahedra linked by common edges become distinct. Above and below the empty $Mn^{IV}$ sites are either $Mn^{II}$ or $Cd^{II}$ [$Ca^{II}$ in the example we are disclosing] completing the composition $Mn_2{}^{II}Mn_3{}^{IV}O_8$ or $Cd_2Mn_3O_8$ respectively, [$Ca_2Mn_3O_8$ in the example we are disclosing].

"As the oxygen sheets of adjacent $Mn_3O_8$ layers are not close packed, the $Mn^{II}$ or $Cd^{II}$ [$Ca^{II}$ in the present example] get an uncommon coordination from six oxygens forming a distorted trigonal prism."

Thermogravimetrically monitored reduction in hydrogen (FIG. 1) to the rock salt structure confirms the oxygen content. Wet chemical analysis for active oxygen content (i.e. the percentage of excess oxygen above that required by the lowest stable valency state) also confirms the oxygen content, yielding a formula of $Ca_2Mn_3O_8$.

There are several synthesis problems encountered with this particular compound, and they are the ones most probably responsible for the material never having been observed before, even though the Ca/Mn/O system has been extensively studied. First, the Ca/Mn/O system is a very refractory one with its constituents (CaO and $MnO_x$) being fairly unreactive together. Historically, the research done on the Ca/Mn/O system has been performed at high temperatures (>1000°C). The interest has usually been in characterizing the electrical and magnetic properties of the well established compositions ($Ca_2MnO_4$, $Ca_3Mn_2O_7$, $Ca_4Mn_3O_{10}$, $CaMnO_3$, $CaMn_2O_4$). These five compounds are, in fact, the only stable phases in the entire Ca/Mn/O phase diagram above 1000° C in air (0.2 atm $O_2$).

An example of the low reactivity of this system is the difficulty encountered by Warde and Glasser in U.S. Pat. No. 3,935,027 in preparing high surface area $CaMnO_3$. Another indication of the systems refractory nature is the fact that the available phase diagrams for the Ca/Mn/O system only deal with temperatures above 1000° C. See, for example, E. M. Levin, C. R. Robbins, H. F. McMurdie and N. A. Toropov, V. P. Borgakewski, V. V. Lapin and N. N. Kurtseva, Handbook of Phase Diagrams of Silicate Systems, Vol. 1, Binary Systems, second revised edition, pp. 588–590, Israel Program for Scientific Translations, Jerusalem (1972).

The other synthesis problem encountered with $Ca_2Mn_3O_8$ is that its decomposition temperature is relatively low (~875°C at 1 atm. $O_2$) and, therefore, the reaction temperatures employed must also be low. This low temperature of reaction between 2 solids of different chemical composition results in severe kinetic limitations. These kinetic limitations are evident when one reviews the work of Toussaint, Revue de Chemie Minerale, 1, 141 (1964) wherein was published an extensive study of the Ca/Mn/O system surveying the entire phase diagram down to temperatures as low as 600°C. The results of Toussaint's research, which employed conventional solid state reaction techniques, indicated that he was rarely able to prepare pure compounds. While Toussaint reported the existence of two additional phases, stable at lower temperatures, in the Ca/Mn/O system, he did not prepare $Ca_2Mn_3O_8$. This is espedially noteworthy since in the same publication, Toussaint became the first to report the existence of $Cd_2Mn_3O_8$, the Cd analog of $Ca_2Mn_3O_8$.

BRIEF DESCRIPTION OF THE DRAWINGS

FIG. 1 represents the thermogravimetric reduction of $Ca_2Mn_3O_8$ in hydrogen to the rock salt structure confirming the oxygen content.

FIG. 2 presents the electrochemical discharge of $Ca_2Mn_3O_8$.

FIG. 3 presents the electrocatalytic reduction of oxygen by $Ca_2Mn_3O_8$.

THE INSTANT INVENTION

The existence of the compound, $Ca_2Mn_3O_8$, was unexpectedly observed as a result of the use of the Solid Solution Precursor technique (disclosed in copending Application Ser. No. 684,744 filed May 10, 1976 herein incorporated by reference) a materials preparation method which circumvents the kinetic limitations encountered with conventional solid state reaction techniques. The method makes use of a Ca/Mn carbonate solid solution (calcite crystal structure). The atomic scale mixing of cations in the solid solution precursor allows decomposition of the carbonate to the fully reacted oxide at temperatures as low as 600° up to 875°C. This preparative method yields a pure product of $Ca_2Mn_3O_8$ having a relatively high specific surface area (20–50 m$^2$/g). The importance of preparing the material in high surface area form will become obvious when applications for $Ca_2Mn_3O_8$ are discussed.

Subsequent to synthesizing the material by the Solid Solution Precursor technique, it was attempted to synthesize the compound making use of conventional solid state reaction techniques. It was found that by heating, in the presence of oxygen, a mixture of calcium salt and manganese salt for prolonged periods (approximately 1 week), with repeated interruptions for mechanically regrinding the material one could not synthesize a pure sample of $Ca_2Mn_3O_8$. While this experiment (solid state reaction technique) utilized carbonates and acetates, most commonly obtained salts of calcium and manganese (i.e. nitrates, oxalates, sulfates, etc.) would give similar results, i.e. only minor phase of the compound. Using oxides rather than salts as starting materials would aggravate the problem since oxides are more refractory and generally less reactive. It should be emphasized that the only way by which it is possible to prepare $Ca_2Mn_3O_8$ in pure form is by the Solid Solution Precursor technique.

Following are several examples of different techniques which have been used to attempt the synthesis of $Ca_2Mn_3O_8$.

EXAMPLE 1: A 2:3 molar ratio of $CaCO_3$ to $MnCO_3$ is mechanically mixed by dry grinding in a mortar and pestle. This mixture is then fired at 650° C in air for total of 121 hours, the firing being frequently interrupted so that the sample undergoes approximately 6 additional dry grindings.

X-ray diffraction shows that the final product is mostly $CaO$, $Mn_2O_3$ and $CaMn_3O_6$ with only minor amounts of $Ca_2Mn_3O_8$.

EXAMPLE 2: A 2:3 Ca:Mn Solid Solution Calcite Precursor is prepared as follows:

Solution 1: 0.0700 moles $CaCO_3$ 0.1120 moles $MnCO_3$ dissolved in 100 ml distilled $H_2O$ plus sufficient nitric acid to effect complete solution (pH 1–5).

Solution 2: 1.072 moles $(NH_4)_2CO_3$ dissolved in 500 ml distilled $H_2O$.

Solution 1 is added to solution 2 with stirring over approximately 2 minutes. The precipitate is then separated from the aqueous phase by vacuum filtration. The precipitate is dried to constant weight in a microwave oven and stored in an inert atmosphere.

The resulting $Ca_2Mn_3(CO_3)_5$ solid solution is fired for 1 hour at 700° C in oxygen. X-ray diffraction indicates that the product is pure $Ca_2Mn_3O_8$ with no second phases evident.

Electrochemical Discharge

The Mn valence which is stabilized in $Ca_2Mn_3^{4+}O_8$ indicates that electrochemical discharge to $Ca_2Mn_3(OH)_{10}$ should yield a 6 electron reduction per formula unit. $CaMn^{4+}O_3$ which is useful as a battery cathode (U.S. Pat. No. 3,939,008) also stabilizes all of its Mn as $Mn^{4+}$, but this material suffers from the disadvantage of requiring 1 electrochemically inactive Ca for every electrochemically active Mn (38.4 wt.% $Mn^{4+}$). $Ca_2Mn_3^{4+}O_8$, on the other hand, requires only 0.67 electrochemically inactive Ca for each electrochemically active Mn (44.2 wt.% $Mn^{4+}$).

$Ca_2Mn_3O_8$ has been discharged as a primary battery cathode in an electrochemical half-cell using an electrolyte of 9N KOH. In these tests, enough electrolyte, typically 60–80 wt.%, is added to the cathode-active material to form a thick paste. An amount of this paste sufficient to fill the electrode cavity is compressed into polytetrafluoroethylene cell between a gold current collector and a separator supported by a gold screen. The entire cell with the cathode material in it is weighed in order to determine the amount of material used. The cell is designed so that it can contain from 0.10 to 0.5 g of cathode-active material and that the effective working area of the cathode is 5 cm$^2$. A Whatman GF/F glass fiber filter paper is used as the separator. The polytetrafluoroethylene cell containing the cathode material is immersed into 320 ml of electrolyte. The cathode is examined at room temperature using a standard half-cell arrangement with a graphite counter electrode and a saturated calomel reference electrode, SCE. The electrolyte is purged with nitrogen to remove dissolved oxygen. The half-cell is discharged by driving it galvanostatically (at constant current).

EXAMPLE 3:

Electrochemical Discharge, $Ca_2Mn_3O_8$

Following the general procedures of the preceding example, a half-cell containing 0.1645 g of $Ca_2Mn_3O_8$ was discharged to completion at a current density of 0.20 mA/cm$^2$. FIG. 2 shows the half-cell potential (V, SCE) vs. time of discharge.

The discharge was initiated after the open circuit voltage of the material had stabilized at $-$ 0.08 V, SCE. Upon closing the circuit the voltage dropped rapidly to approximately $-$0.45 V, SCE and stayed fairly level at that voltage for approximately 45 hours. The polarization in this plateau region was found by open circuiting (in another but similar half-cell discharge) to be approximately 0.10 V. At the end of this plateau region the voltage decreased again to approximately $-$0.70 V, SCE. The remainder of the curve, to final discharge, was s-shaped. If the cathode was fully utilized (6 electron reduction per formula unit), the discharge for the weight of material used should have lasted 71 hours. The actual discharge took approximately 73 hours and so the discharge capacity of this electrode was approximately 103% of the theoretically calculated capacity. X-ray diffraction of the discharged product shows it to consist of a Ca-rich hydroxide and a Mn-rich hydroxide.

The greater than 100% theoretical discharge capacity could be due to errors in estimating the weight of the active material. These errors arise because of the fact that not all of the cathode paste that is made is used. Thus, the amount of active material in the electrode must be calculated using the weighed fractions of the original components. This calculation assumes perfectly homogeneous mixing of the original constituents. This may not be entirely true. In addition, one of the components of the paste (KOH solution) is volatile, and this can introduce errors. One other error may be introduced by the presence of acetylene black which, on its own, can give a very few hours of discharge.

Electrocatalytic Reduction of Oxygen

One application for which the compound $Ca_2Mn_3O_8$ has been evaluated for is oxygen reduction at a fuel cell cathode. In these tests the material was fabricated into test electrodes consisting of the catalyst, a binder, a wetproofing agent and a support. Teflon served as both a binder and wetproofing agent for all the electrodes tested. Gold expanded metal screen (Exmet) was used as the support.

Electrodes were fabricated by mixing a weighed amount of material with a few drops of water, adding a measured volume of Teflon 42 suspension, and mixing vigorously to precipitate the Teflon. The gummy product was then spread on a weighed gold Exmet screen and pressed dry between filter paper. The electrode was then cold pressed for 0.5 min. at 200 psi, allowed to air dry for 30 min., and then hot pressed at 325° C, 500 psi for 0.5 min. After cooling, the electrode was weighed to determine its loading and then placed in the electrochemical cell for testing.

The electrochemical half-cell used for testing was of the interface maintaining type and consisted of a jacketed liquid phase cell compartment and a gas phase cell compartment. The liquid side contains the platinum wire counter electrode, a saturated calomel reference electrode (in contact by Lugin capillary), and magnetic stirrer. The gas side contains the gas inlet and outlet and a stopcock to drain off any condensate. The working electrode is held in place (between the two compartments) between two Teflon disks with a gold current collector pressing against it.

The cell was connected to a Princeton Applied Research Model 173 potentiostat with a programmer and logarithmetic current converter. Outputs of potential and log of current were recorded on an x–y plotter, the resulting potential vs. log current density plot, referred to as a performance curve, used to evalutate the electrode activity.

EXAMPLE 4:

Electrocatalytic Reduction of Oxygen with $Ca_2Mn_3O_8$

An electrode containing 0.214 g of $Ca_2Mn_3O_8$ was evaluated in the fuel cell apparatus described. FIG. 3 shows the resulting performance curves. Curve 1 represents the activity of the electrode when oxygen is continually supplied to it. The open circuit voltage was $-146$ mV, SCE. When the half-cell is purged with nitrogen and the performance curve is run with nitrogen continually supplied, the electrode activity is eliminated as shown by curve 2. This demonstrates that the activity exhibited by the electrode in oxygen (curve 1) is truly catalytic in nature (i.e., it is not just the electrochemical reduction of the active material taking place). When oxygen is restored to the half-cell, the activity is entirely regained, curve 3 being coincident with curve 1.

The activity this material exhibits for the electrocatalytic reduction of oxygen suggests that it may be interesting for other applications involving the activation of oxygen containing molecules such as partial oxidation and methanol decomposition.

The utility of $Ca_2Mn_3O_8$ for catalytic, electrocatalytic, and battery cathode applications is dependent on the ability to synthesize the material in a reasonably high surface area form. This is necessary in order to maximize the number of available catalytically active sites, and for cathode applications to maximize the rate of discharge. The solid solution precursor method of materials preparation allows us to synthesize pure, fully reacted $Ca_2Mn_3O_8$ in a relatively high surface area form (20–50 m²/g). Table I lists typical Solid Solution Precursor synthesis conditions for $Ca_2Mn_3O_8$ and the specific surface areas obtained.

TABLE I

| Surface Areas of $Ca_2Mn_3O_8$ Synthesized From Solid Solution Precursor | |
|---|---|
| Firing Conditions | S.A. (m²/g) |
| .5 hr., 600° C | 52 |
| 1 hr., 600° C | 43 |
| 2 hrs., 600° C | 40 |
| 2 hrs., 650° C | 25 |
| 2 hrs., 700° C | 20 |

The loose inter-layer bonding nature of the $Mn_3O_8$ sheets suggests that the $Ca^{2+}$ cations could be replaced by other large divalent cations such as $Ba^{2+}$ or $Sr^{2+}$. This partial or complete substitution might be effected by the types of preparative methods we have already described or by other techniques such as ion exchange (electrochemically or otherwise) out of liquid media.

It might also be possible to introduce charge compensating trivalent and monovalent cations for the divalent cations in this structure. It is expected that these inter-layer cation sites should exhibit high ionic conductivity been the layers.

What is claimed is:
1. A pure, single phase compound having a monoclinic structure and the approximate parameters $a = 11.01$ A, $b = 5.84$ A, $c = 4.95$ A, $\alpha = 90°, \beta = 109.80°, \gamma = 90°$ of the formula $Ca_2Mn_3O_8$.
2. The compound of claim 1 which has a surface area ranging from about 20 m²/g to 50 m²/g.

* * * * *